United States Patent
Hong et al.

(10) Patent No.: US 8,793,519 B2
(45) Date of Patent: Jul. 29, 2014

(54) METHOD FOR REDUCING POWER CONSUMPTION BASED ON MOTION SENSOR AND PORTABLE TERMINAL USING THE SAME

(75) Inventors: Hyun Su Hong, Seongnam-si (KR); Byung Duck Cho, Seoul (KR); Young Hee Ha, Yongin-si (KR); Jae Myeon Lee, Yongin-si (KR); Kyung Hwa Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 12/691,974

(22) Filed: Jan. 22, 2010

(65) Prior Publication Data
US 2010/0181988 A1   Jul. 22, 2010

(30) Foreign Application Priority Data
Jan. 22, 2009   (KR) .................. 10-2009-0005342

(51) Int. Cl.
G06F 1/32 (2006.01)
G06F 1/00 (2006.01)
B23K 11/24 (2006.01)
G09G 5/00 (2006.01)
H04M 1/00 (2006.01)
G01P 15/00 (2006.01)
G01C 9/00 (2006.01)

(52) U.S. Cl.
CPC ............ *G06F 1/3206* (2013.01); *G06F 1/3203* (2013.01)
USPC ........... 713/320; 713/300; 323/318; 345/156; 345/204; 455/574; 702/141; 702/150

(58) Field of Classification Search
CPC .............................. G06F 1/3206; G06F 1/3203
USPC ........... 713/300, 320; 323/318; 345/156, 204; 455/574; 702/141, 150
See application file for complete search history.

(56) References Cited

U.S. PATENT DOCUMENTS

| | | | |
|---|---|---|---|
| 5,760,636 A * | 6/1998 | Noble et al. ................. | 327/513 |
| 7,158,913 B2 * | 1/2007 | Park et al. .................... | 702/150 |
| 7,406,612 B2 * | 7/2008 | O'Connor et al. ........... | 713/320 |
| 7,500,124 B2 * | 3/2009 | Seo ................................. | 713/322 |
| 8,117,473 B2 * | 2/2012 | Oh .................................. | 713/322 |
| 8,195,220 B2 * | 6/2012 | Kim et al. ................... | 455/550.1 |
| 8,255,010 B2 * | 8/2012 | Cheng et al. ................. | 455/574 |
| 2002/0016694 A1 * | 2/2002 | Tsuji ............................ | 702/138 |
| 2007/0057068 A1 * | 3/2007 | Tsai .......................... | 235/472.01 |
| 2009/0195497 A1 * | 8/2009 | Fitzgerald et al. ........... | 345/156 |
| 2009/0262078 A1 * | 10/2009 | Pizzi ............................. | 345/169 |

* cited by examiner

*Primary Examiner* — Stefan Stoynov
(74) *Attorney, Agent, or Firm* — H.C. Park & Associates, PLC

(57) ABSTRACT

A method for reducing power consumption based on a motion sensor and a portable terminal adapted to the method are disclosed. The method includes terminating driving of a motion recognition program according to whether an input is detected by at least one sensor unit disposed in the portable terminal, and switching a mode of a controller included in the portable terminal into a motion recognition deactivation mode. The motion sensor-based portable terminal can reduce the power consumption, thereby lengthening the life span of the battery. The user can use the motion sensor-based portable terminal for a long period of time without frequently recharging its battery.

20 Claims, 6 Drawing Sheets

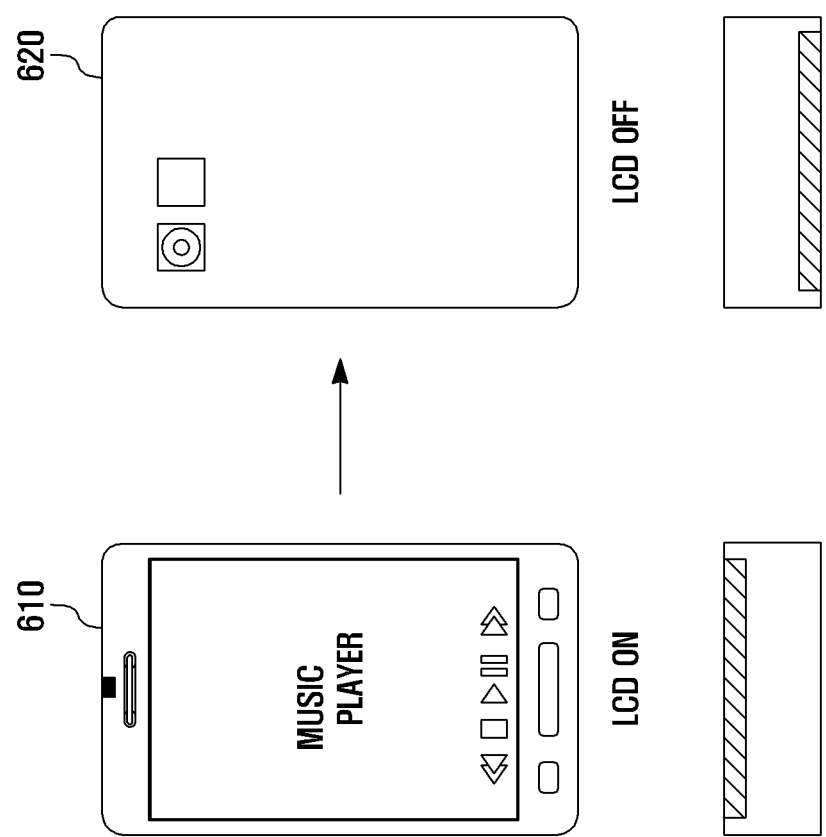

METHOD FOR REDUCING POWER CONSUMPTION BASED ON MOTION SENSOR AND PORTABLE TERMINAL USING THE SAME

CROSS REFERENCE TO RELATED APPLICATION

This application claims priority from and the benefit of Korean Patent Application No. 10-2009-0005342, filed on Jan. 22, 2009, which is hereby incorporated by reference for all purposes as if fully set forth herein.

BACKGROUND OF THE INVENTION

1. Field of the Invention

Exemplary embodiments of the present invention relate to portable terminals, and more particularly, to a method for reducing power consumption by controlling driving of a motion recognition program, and a portable terminal using the same.

2. Discussion of the Background

In recent years, as portable terminals have become widely used, they have also become important tools in modern society. With the increase in popularity of portable terminals, user interface (UI) techniques regarding portable terminal control methods have been developed.

Conventional UI is performed through a keypad of a portable terminal. UI techniques using a touch sensor or a haptic sensor have recently been developed. UI techniques using a motion sensor recognizing the motion of users have also been developed. When a user performs an action with a portable terminal having a motion sensor, the portable terminal recognizes the user's action and performs a function corresponding thereto.

In general, when a portable terminal executes a motion recognition-based application, a motion sensor and a motion recognition program are operated and, accordingly, a processor for controlling applications within the portable terminal also operates at a speed suitable for driving the motion sensor and the motion recognition program. When the motion sensor detects a motion input, the processor controlling the application performs a function corresponding to the motion according to the motion recognition program.

If an application continuously detects user motions, it is preferable that the motion sensor and the motion recognition program are continuously driven in order to recognize the user motion in real time. However, if an application detects user motion, but not continuously, driving the motion sensor and the motion recognition program continuously would cause power to be unnecessarily consumed. For example, the user inputs a motion to execute a call function and then maintains the call state for a long period of time, or the user inputs a motion to execute an MP3 player or a radio set and simply listens to music without inputting any further motion for a long period of time. If the motion sensor and the motion recognition program are kept active while the user maintains call communication or listens to music, the processor controlling the is application for driving them may be driven at a high speed, consuming power, which causes battery life span to be shortened.

In order to operate the portable terminal for a long period of time, a battery capacity may be large. However, the restriction in the size of the portable terminal leads to restriction in the battery capacity. Thus, it is beneficial to reduce power consumption of the battery in order to increase usage time of the portable terminal, rather than increasing the battery capacity.

SUMMARY OF THE INVENTION

Exemplary embodiments of the present invention provide a method for reducing power consumption of a portable terminal based on a motion sensor.

Exemplary embodiments of the present invention also provide a portable terminal adapted to the method for reducing power consumption.

Additional features of the invention will be set forth in the description which follows, and in part will be apparent from the description, or may be learned by practice of the invention.

An exemplary embodiment of the present invention discloses a method for reducing power consumption of a portable terminal, the method including terminating driving of a motion recognition program according to whether an input is detected by at least one sensor unit disposed in the portable terminal, and switching a mode of a controller in the portable terminal into a motion recognition deactivation mode.

An exemplary embodiment of the present invention also discloses a portable terminal, including a motion sensor, a storage unit configured to store a motion recognition program, a sensor unit configured to generate a signal for terminating or initiating driving of the motion recognition program according to whether an input is sensed, and a controller configured to control the motion recognition program.

An exemplary embodiment of the present invention also discloses a method for reducing power consumption of a portable terminal, the method including receiving an input signal from at least one sensor provided in the portable terminal, and switching a state of a display screen to an OFF state according to the input signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 6 shows a display unit of the portable terminal according to exemplary embodiments of the present invention.

DETAILED DESCRIPTION OF THE ILLUSTRATED EMBODIMENTS

Figure 1:
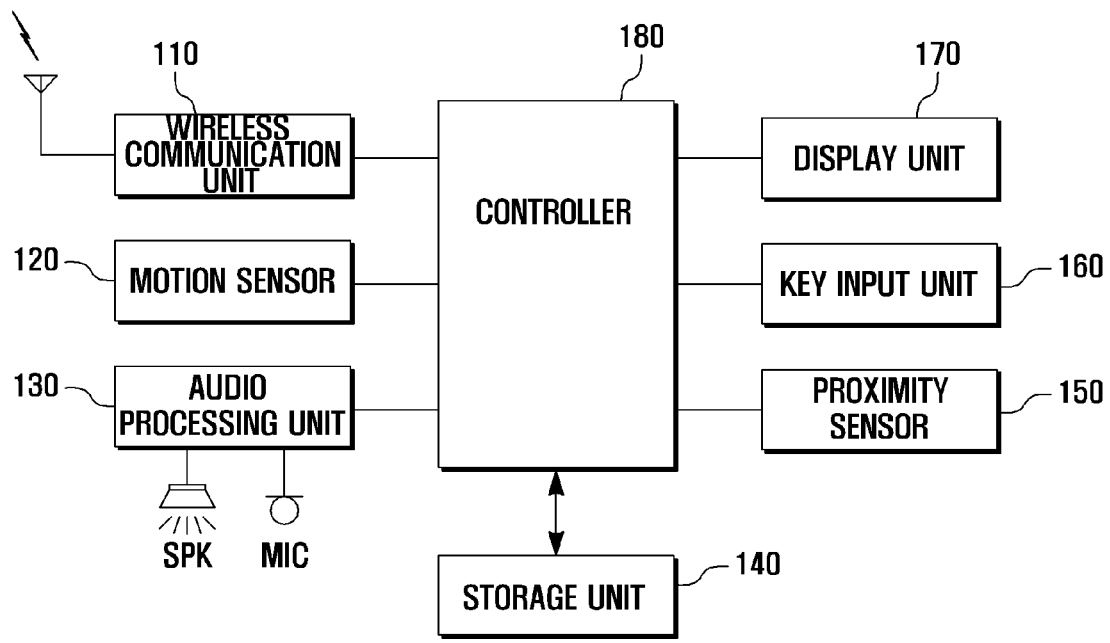
FIG. 1 is a schematic block diagram showing the configuration of a portable terminal for reducing power consumption according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Terms applicable to the present disclosure are defined below. The terms or words used in the present disclosure and appended claims should not be limited by a general or lexical meaning, instead the claims should be analyzed in the context of the present disclosure. Therefore, one skilled in the art will understand that the embodiments disclosed herein are only exemplary, and that various modifications, alterations, and equivalents thereof may replace all or portions of the exemplary embodiments without departing from the spirit of the invention.

The term 'motion recognition program' may refer to software including an algorithm that analyzes a user motion sensed by a motion sensor and executes a corresponding function.

The term 'motion recognition activation mode' of a controller may refer to a state where a controller drives a motion recognition program. The term 'motion recognition deactivation mode' may refer to a state where the controller does not drive the motion recognition program. In the motion recognition deactivation mode, the controller drives a currently executed application at a clock frequency appropriate for driving the application. In general, the controller needs to drive the motion recognition program at a high clock frequency. The controller is driven at a higher clock frequency in the motion recognition activation mode than in the motion recognition deactivation mode.

The term 'general mode' of the motion sensor may refer to a state where the motion sensor senses an input motion in order to generate a sensor signal including data regarding the user motion. The term 'low power mode' may refer to a state where the motion sensor can sense only whether a motion with strength larger than a certain level of strength is generated. That is, when a user motion is input in the 'general mode,' the motion sensor generates a sensed signal including data regarding parameters (e.g., an operation recognition time, a time interval between operations, and operation strength) for a motion recognition, and transfers the generated sensed signal to the controller. In the 'low power mode,' the motion sensor generates a sensed signal including only data indicating that a motion with strength greater than a pre-set level of strength has been generated, and transfers the generated sensed signal to the controller. The pre-set strength is a motion strength value set in the portable terminal, and corresponds to a threshold value of motion appropriate to drive the motion sensor of the low power mode. The threshold value may be set as a default value in the portable terminal. The default value may be set by the user. When the motion sensor is driven in the 'low power mode,' the motion recognition program is not driven.

In the following description, exemplary embodiments of the present invention will be described with reference to a portable terminal, however, it should be understood that the present invention is not limited to the exemplary embodiments disclosed herein. The portable terminal may include motion sensors. The portable terminal can be any suitable type of mobile communication terminal, or multimedia device, such as, for example, portable multimedia players (PMPs), personal digital assistants (PDAs), smart phones, and MP3 players.

FIG. 1 is a schematic block diagram showing the configuration of a portable terminal for reducing power consumption according to an exemplary embodiment of the present invention.

Referring to FIG. 1, the wireless communication unit 110 is configured to transmit and receive data for radio communication of the portable terminal. The wireless communication unit 110 may include an RF transmitter for up-converting the frequency of a transmitted signal and amplifying the transmitted signal, and an RF receiver for low-nose-amplifying a received signal and down-converting the frequency of the received signal. Also, the wireless communication unit 110 may receive data via a radio channel and output it to the controller 180, and may transmit data outputted from a controller 180 via a radio channel.

A motion sensor 120 may detect a motion input to the portable terminal. The motion sensor 120 according to an exemplary embodiment of the present invention may include an ultrasonic sensor, an acceleration sensor, a camera sensor, a gyro sensor, and the like. The gyro sensor may be an optical gyro sensor or a mechanical gyro sensor, and any sensor may be used so long as it can detect a motion input. In particular, the motion sensor 120 according to an exemplary embodiment of the present invention can be operable in the general mode and in the low power mode. When a motion (e.g., a user motion) is input while the motion sensor 120 is operating in the general mode, the motion sensor 120 generates a sensor signal including data regarding parameters used for recognizing a motion input, and transfers the generated sensor signal to the controller 180. When a motion is input while the motion sensor 120 is operating in the low power mode, the motion sensor 120 transfers a sensor signal, including only data that a motion with strength larger than a certain level of strength has been generated, to the controller 180.

An audio processing unit 130 may be configured to include a coder-decoder (CODEC). The CODEC may be composed of a data CODEC for processing, for example, packet data, and an audio CODEC for processing an audio signal. The audio processing unit 130 converts a digital audio signal into an audio signal through the audio CODEC and reproduces it through a speaker SPK, and converts an analog audio signal input from a microphone MIC into a digital audio signal through the audio CODEC. When the controller 180 is converted into the motion recognition activation mode or the motion recognition deactivation mode, the audio processing unit 130 according to an exemplary embodiment of the present invention may output a corresponding sound effect. When the controller 180 performs a switching process from a motion recognition deactivation mode to a motion recognition activation mode, the audio processing unit 130 outputs a corresponding sound effect so that the user can recognize whether a motion can be currently input.

A storage unit 140 may store programs and data used to operate the portable terminal, and may be composed of a program area and a data area. The storage unit 140 according to an exemplary embodiment of the present invention may store a motion recognition program. Also, the storage unit 140 may store at least one application that can be executed in the portable terminal.

The proximity sensor 150 may sense whether an object approaches the portable terminal. When an object approaches the proximity sensor 150 of the portable terminal and reaches a pre-set distance from the proximity sensor 150, the proximity sensor 150 senses the approach of the object. The proximity sensor 150 may be configured, for example, as a capacitive touch sensor, or any suitable sensor that can sense an approach of an object. In response to sensing an approach of an object, the proximity sensor 150 may transmit an approach sense signal to the controller 180.

A key input unit 160 receives a key operating signal input for controlling the portable terminal, and transfers the received key operating signal to the controller 180. The key input unit 160 may be configured as a keypad including number keys and direction keys. The key input unit 160 may include a touch pad in the case of a touch screen-based portable terminal.

A display unit 170 may include a liquid crystal display (LCD). The display unit 170 may display menus of the portable terminal, input data, function setting information, and various types of information. For example, the display unit 170 may output a booting screen image, an idle screen image, a display screen image, a call screen image, and other application execution screen images of the portable terminal. According to an exemplary embodiment of the present invention, the display unit 170 may display a message indicating that a motion can be input, when the controller 180 drives the motion recognition program. According to an exemplary embodiment of the present invention, the display unit 170 may display a message indicating that a motion cannot be input when the controller 180 terminates driving of the motion recognition program. Thus, the user may determine whether the portable terminal can recognize a motion through the message displayed on the display unit 170. Also, according to an exemplary embodiment of the present invention, the display unit 170 may switch a state of the display screen to an ON or OFF state according to a user input.

The controller 180 controls the entire operation of the portable terminal. In an exemplary embodiment of the present invention, the controller 180 may include an application processor. The application processor may control an application included in the portable terminal. The application according to an exemplary embodiment of the present invention may correspond to a particular application program executed in the portable terminal. It should be understood, however, that the present invention is not limited to the exemplary embodiments disclosed herein. For example, the application may correspond to a background screen image display function or a display screen OFF function. The application processor may be configured to be included in a modem or may be configured to be separated from the modem. That is, the controller 180 may include a processor for controlling an application and a processor for controlling a call function, or may be configured as a single processor that controls every function that can be executed in the portable terminal. Also, the controller 180 may include a plurality of processors each having a different function. In an exemplary embodiment of the present invention, the controller 180 may be a processor for controlling the entire operation of the portable terminal or may be a processor for controlling an application program.

According to an exemplary embodiment of the present invention, the controller 180 may control driving of the motion recognition program and the motion sensor. The controller 180 may switch modes according to whether the motion recognition program or the motion sensor is driven. The controller 180 may switch the motion recognition activation mode to the motion recognition deactivation mode or vice versa. The controller 180 is driven at a higher clock frequency in the motion recognition activation mode than in the motion recognition deactivation mode. In an exemplary embodiment of the present invention, the controller 180 may adjust the clock frequency according to whether the motion recognition program or the motion sensor is driven. In this case, the controller 180 is driven at a clock frequency appropriate to drive a currently executed application.

Figure 2:
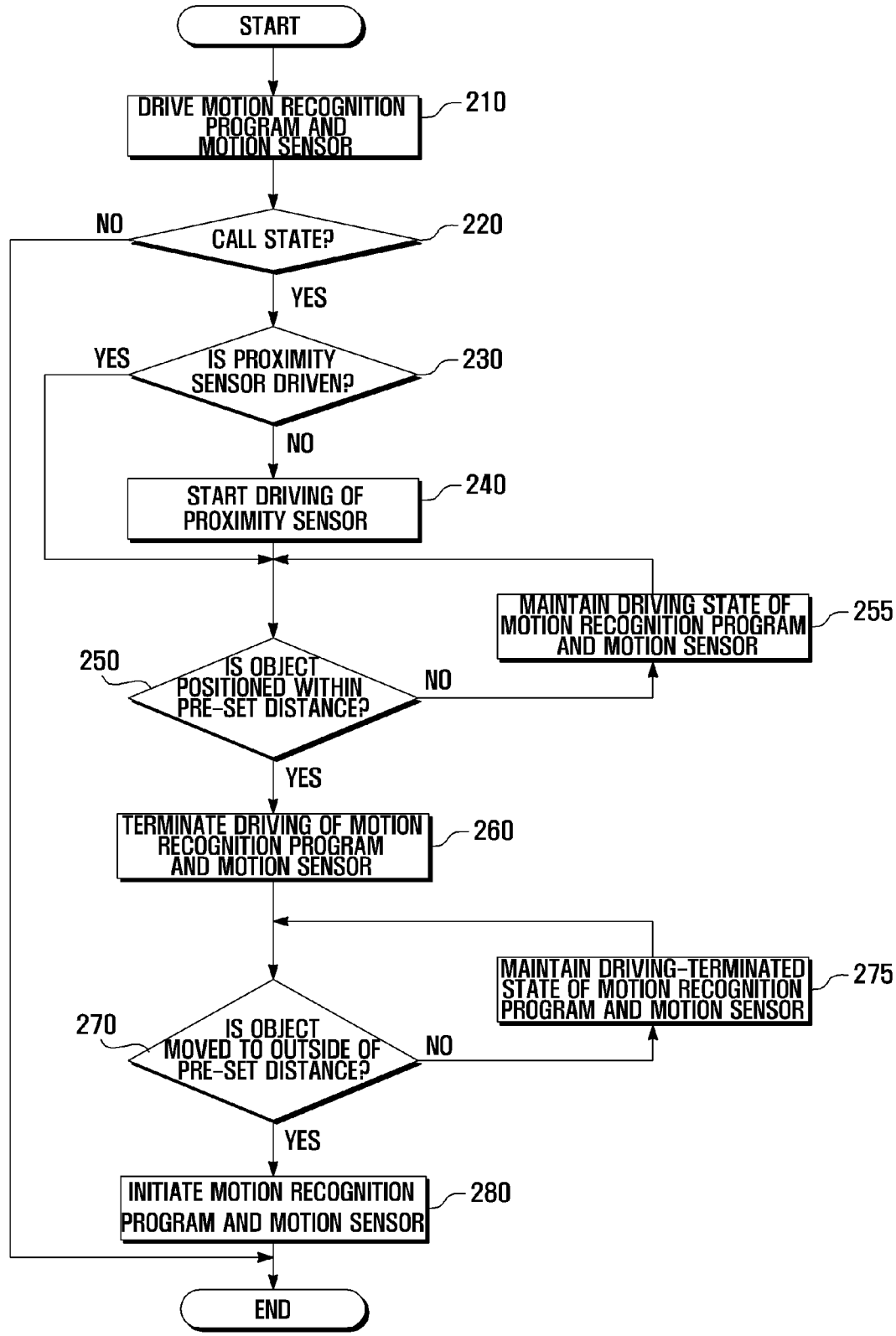
FIG. 2 is a flow chart that describes a method for reducing power consumption of a portable terminal according to an exemplary embodiment of the present invention.

FIG. 2 is a flow chart that describes a method for reducing power consumption of a portable terminal according to an exemplary embodiment of the present invention.

In operation 210, the controller 180 drives the motion recognition program and the motion sensor 120. The motion sensor is driven in the general mode at operation 210. If a motion is input while the motion sensor 120 is driven in the general mode, the controller 180 receives a sensor signal from the motion sensor 120, analyzes the motion according to the motion recognition program, and executes a corresponding function.

In operation 220, the controller 180 determines whether the portable terminal is currently in a call communication state. If the portable terminal is currently in a call communication state at operation 220, the controller 180, in operation 230, determines whether the proximity sensor 150 is in a driving state. If the proximity sensor 150 is not in a driving state at operation 230, the controller 180, in operation 240, starts driving of the proximity sensor 150. If the proximity sensor 150 is in a driving state at operation 230, operation 250 is performed. According to an exemplary embodiment of the present invention, the controller 180 may drive the proximity sensor 150 while the portable terminal is turned on. In this case, operation 230 and operation 240 may be omitted, and operation 250 may be performed following operation 220.

In operation 250, the controller 180 determines whether an object approaches the proximity sensor 150. The proximity sensor 150 may be positioned at the display unit 170, the microphone MIC, or the speaker unit SPK. When a user performs call communication while holding the portable terminal such that the speaker unit nears the user's ear, a portion of the display unit 170 is close to the user's face (e.g., the user's cheek) and the proximity sensor 150 senses the approach of the object. The controller 180 determines whether the object is within a pre-set distance from the proximity sensor 150.

If the distance between the proximity sensor 150 and the object is, in operation 250, determined to be greater than the distance set in the portable terminal, the controller 180, in operation 255, maintains the driving state of the motion recognition program and the motion sensor 120. If the distance between the proximity sensor 150 and the object is, in operation 250, determined to be less than the distance set in the portable terminal, the controller 180, in operation 260, may terminate driving of the motion recognition program and the motion sensor 120. Alternatively, in operation 260, the controller 180 may drive the motion sensor 120 in low power mode, and may terminate only the driving of the motion recognition program without terminating the driving of the motion sensor 120. In this case, the controller 180 may terminate the driving of the motion recognition program, and may switch the mode of the motion sensor 120 from motion recognition activation mode to motion recognition deactivation mode. In the motion recognition deactivation mode, the controller 180 is driven at a lower clock frequency than in the motion recognition activation mode. In this case, the controller 180 is driven at a clock frequency appropriate for driving a currently executed application.

In operation 270, the controller 180 controls the proximity sensor 150 to determine whether the distance between the object and the proximity sensor 150 becomes greater than the pre-set distance. For example, the controller determines whether the user removes the speaker part of the portable terminal from the user's ear during the call communication.

If the distance between the object and the proximity sensor 150 is less than the pre-set distance according to the result at operation 270, the controller 180, in operation 275, maintains the driving-terminated state of the motion recognition program and the motion sensor. If the distance between the object and the proximity sensor 150 becomes greater than the pre-set distance according to the result at operation 270, the controller 180, in operation 280, starts driving of the motion recognition program and the motion sensor 120. When the motion sensor 120 is in the general mode, the controller 180 maintains the motion sensor 120 in the general mode. When the motion sensor 120 is in low power mode or when driving of the motion sensor 120 has been terminated, the controller 180 drives the motion sensor 120 in general mode. Also, the controller 180 switches its mode from the motion recognition deactivation mode to the motion recognition activation mode. In the motion recognition activation mode, the controller 180 drives the motion recognition program to perform a calculation process regarding motion recognition, so the controller 180 is driven at a higher clock frequency than in the motion recognition deactivation mode.

According to an exemplary embodiment of the present invention, when the distance between the object and the proximity sensor 150 becomes greater than the pre-set distance according to the result at operation 270, the controller 180 may activate the motion sensor 120 in low power mode. In low power mode, the motion sensor 120 may sense only whether a motion with strength greater than a pre-set level of strength is input. Alternatively, when the distance between the object and the proximity sensor 150 becomes greater than the pre-set distance, the controller 180 may begin measuring time, and when a sufficient time passes, the controller 180 may activate the motion sensor 120 in low power mode.

The controller 180 may drive the motion sensor 120 in low power mode and may maintain the motion recognition program in the driving-terminated state. Subsequently, the controller 180 may control the motion sensor 120 to determine whether a motion with strength greater than a pre-set level of strength (threshold value) is input. If a motion with strength less than the pre-set level is input to the portable terminal, the controller 180 may maintain the driving of the motion sensor 120 in the low power mode, whereas if a motion with strength greater than the pre-set level is input, the controller 180 may switch the mode of the motion sensor 120 into the general mode, and may initiate the motion recognition program. As the controller 180 initiates the motion recognition program and drives the motion sensor in the general mode, the mode of the controller 180 is also switched from the motion recognition deactivation mode to the motion recognition activation mode.

According to an exemplary embodiment of the present invention, the controller 180 may adjust the clock frequency incrementally. For example, when the clock frequency of the controller 180 is adjustable by n number of steps, the controller 180 may adjust the clock frequency step by step according to the driving state of the motion recognition program, the driving state (e.g., general mode, low power mode, and termination mode) of the motion sensor 120, and the driving state of the proximity sensor 150.

An exemplary embodiment of the present invention can be applied where the user performs a call function. In an exemplary embodiment, when the user performs the call function while holding the speaker unit of the portable terminal to his/her ear, the driving of the motion recognition program and the motion sensor are terminated to prevent unnecessary power consumption. Also, the user may perform call communication in a speaker phone mode, so when the speaker unit of the portable terminal is removed from the user's ear even during call communication, the motion recognition program and the motion sensor may start driving to recognize a user motion.

Figure 3:
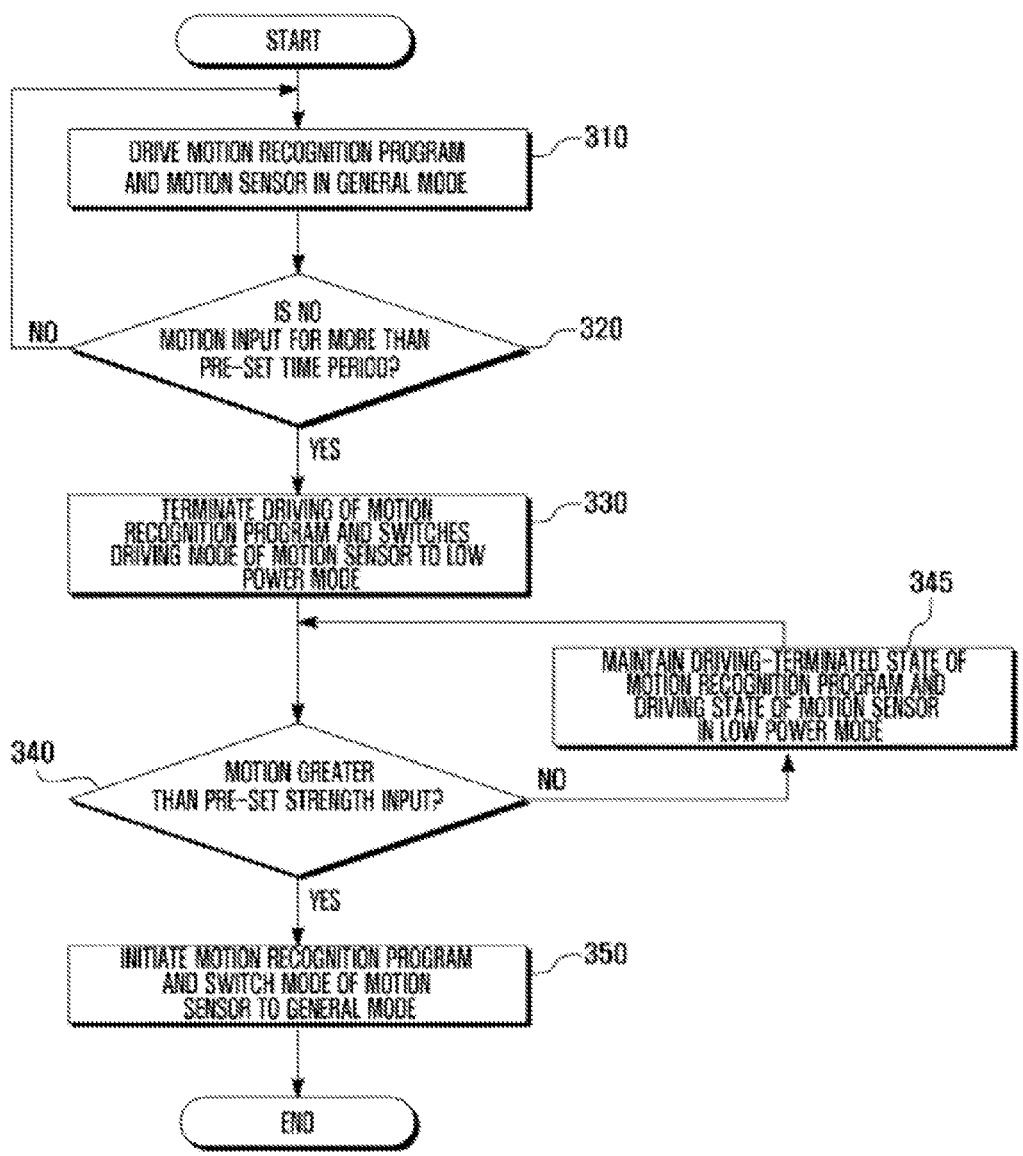
FIG. 3 is a flow chart that describes a method for reducing power consumption of a portable terminal according to an exemplary embodiment of the present invention.

FIG. 3 is a flow chart that describes a method for reducing power consumption of a portable terminal according to an exemplary embodiment of the present invention.

In operation 310, the controller 180 drives the motion recognition program and the motion sensor 120. The controller 180 drives the motion sensor 120 in the general mode. If the motion sensor 120 in the general mode senses a user motion (or user motions), it may transmit a sensor signal including data (e.g., a motion recognition time, a time interval between motions, and a motion strength) for analyzing the user motion to the controller 180.

In operation 320, the controller 180 determines whether there has been no motion input in the portable terminal for a pre-set time period. The pre-set time period may correspond to a value set in the portable terminal or may be set by the user. After a user motion is input, the controller 180 measures time and determines whether there is no motion input until the end of the pre-set time period. When a user motion is input before the end of the pre-set time period, the controller 180 maintains the driving state of the motion recognition program and the driving state of the motion sensor in the general mode at operation 310. If no motion is input for the pre-set time period, the controller 180, in operation 330, terminates driving of the motion recognition program and switches the driving mode of the motion sensor 120 to low power mode. According to an exemplary embodiment of the present invention, the controller 180 may instead continue driving the motion sensor 120 in the general mode. In the case where the controller 180 terminates the driving of the motion recognition program and drives the motion sensor 120 in low power mode, the mode of the controller 180 is also switched from the motion recognition activation mode to the mode recognition deactivation mode. According to an exemplary embodiment of the present invention, the controller 180 may adjust the clock frequency incrementally, and it may be driven at an appropriate clock frequency corresponding to the termination of the driving of the motion recognition program and the driving of the motion sensor in the low power mode.

The motion sensor 120 in the low power mode can sense whether a motion with strength greater than the pre-set level of strength is input. That is, when a motion (or motions) is input, the motion sensor 120 transfers a sensor signal indicating whether a motion has been input to the portable terminal to the controller 180, rather than transferring a sensor signal including data such as, for example, a motion recognition time, a time interval between motions, a motion strength, or a motion pattern.

In operation 340, the controller 180 determines whether a motion with strength greater than the threshold strength level set in the portable terminal is input. When the user inputs a motion to the portable terminal, the motion sensor 120 in the low power mode may recognize whether a motion with strength greater than the pre-set level of strength has been input. When a motion with strength greater than the pre-set level of strength is input, the motion sensor 120 transfers to the controller 180 a sensor signal indicating that the motion has been input to the portable terminal. Upon receiving the sensor signal, the controller 180 can determine whether a motion has been input to the portable terminal.

If a motion with strength greater than the pre-set level of strength has not been input to the portable terminal according to the result at operation 340, the controller 180, in operation 345, maintains the driving-terminated state of the motion recognition program and maintains the driving state of the motion sensor in low power mode. If a motion with a strength greater than the pre-set strength level is input to the portable terminal according to the result at operation 340, the controller 180, in operation 350, starts driving of the motion recognition program and also drives the motion sensor 120 in general mode. If driving the motion sensor 120 has not been switched at operation 330, the controller 180 may continue driving the motion sensor 120 in general mode at operation 350. As the motion recognition program initiates a driving process and the motion sensor 120 is switched to the general mode, the mode of the controller 180 is also switched from the motion recognition deactivation mode to the motion recognition activation mode.

An exemplary embodiment of the present invention can be applied to a case where the user executes an application for, for example, an MP3 player, a video player, or a radio set. When the user plays audio of the MP3 player and then places the portable terminal on a table, the portable terminal remains in the fixed state until when the user stops playing music or changes the operation of the MP3 player. If the controller 180 continuously maintains the driving state of the motion recognition program, power is wasted. Thus, an exemplary embodiment of the present invention provides that if a motion is not input for more than a certain period of time, the controller 180 terminates the motion recognition program and is driven at a low clock frequency. That is, when there is no motion input to the portable terminal, the driving of the motion recognition program is terminated to thereby reduce power consumption.

Figure 4:
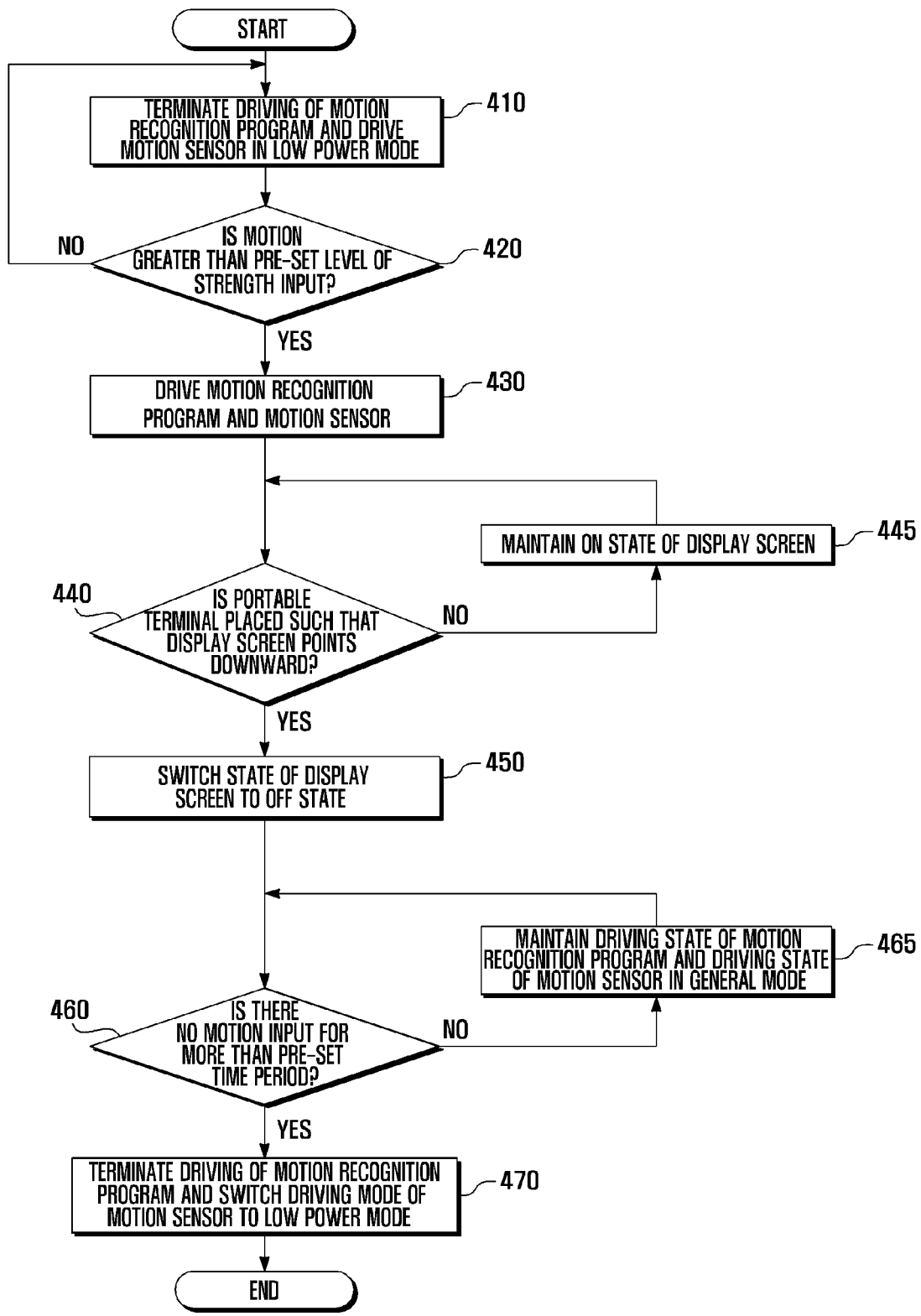
FIG. 4 is a flow chart that describes a method for reducing power consumption of a portable terminal according to an exemplary embodiment of the present invention.

FIG. 4 is a flow chart that describes a method for reducing power consumption of a portable terminal according to an exemplary embodiment of the present invention.

In operation 410, the controller 180 terminates driving (or maintains the driving-terminated state) of the motion recognition program and the drives the motion sensor 120 in the low power mode. If the controller 180 drives the motion recognition program and drives the motion sensor 120 in the general mode, the controller 180 may determine whether a motion is not input for more than a certain period of time, and terminate the motion recognition program and drive the motion sensor in the low power mode.

In operation 420, the controller 180 determines whether the user inputs a motion with strength greater than a pre-set level of strength to the portable terminal through the motion sensor 120. If a motion with strength greater than the pre-set level of strength is input, the motion sensor 120 transfers a sensor signal to the controller 180, including information that the motion has been input to the portable terminal. Upon receiving the sensor signal, the controller 180 may determine whether a motion has been input to the portable terminal.

In operation 430, the controller 180 initiates the motion recognition program and switches the motion sensor 120 from low power mode to general mode. As the motion recognition program is driven and the motion sensor 120 is switched to general mode, the mode of the controller 180 is also switched from motion recognition deactivation mode to motion recognition activation mode.

In operation 440, the controller 180 determines a placed orientation of the portable terminal through the motion sensor 120. In an exemplary embodiment of the present invention, it is assumed that the user inputs a certain motion to the portable terminal and then places the portable terminal on a surface such as, for example, a table or a desk. The controller 180 controls the motion sensor 120 to determine whether the display unit 170 of the portable terminal faces up or down. When the display unit 170 of the portable terminal faces up, the user can view the display unit 170, and when the display unit 170 of the portable terminal faces down, the portable terminal is considered to be placed in a state that the user cannot view the display unit 170.

When the display screen of the portable terminal does not point downward according to the result at operation 440, the controller 180, in operation 445, maintains an ON state of the display unit 170. If the display screen of the portable terminal is determined to point downward according to the result at operation 440, the controller 180, in operation 450, switches the ON state of the display unit 170 to an OFF state. The controller 180, in operation 460, determines whether there is a motion input during a time period set in the portable terminal. If a motion is input during the pre-set time period, the controller 180, in operation 465, maintains the driving state of the motion recognition program and maintains the driving state of the motion sensor in general mode. If no motion is input during the pre-set time period, the controller 180, at operation 470, terminates driving of the motion recognition program and switches the motion sensor 120 to low power mode.

An exemplary embodiment of the present invention provides that the display unit 170 is switched to the OFF signal to reduce power consumption. In an exemplary embodiment of the present invention, if there is no motion input during the pre-set time period, the motion recognition program is terminated and the motion sensor is driven in low power mode to thereby reduce power consumption. In addition, when the motion recognition program is driven and the motion sensor is driven in general mode, a placed orientation of the portable terminal is determined, and if the portable terminal is placed such that the user cannot view the display screen, the display screen is switched to the OFF state to additionally reduce power otherwise consumed by outputting the display screen.

Figure 5:
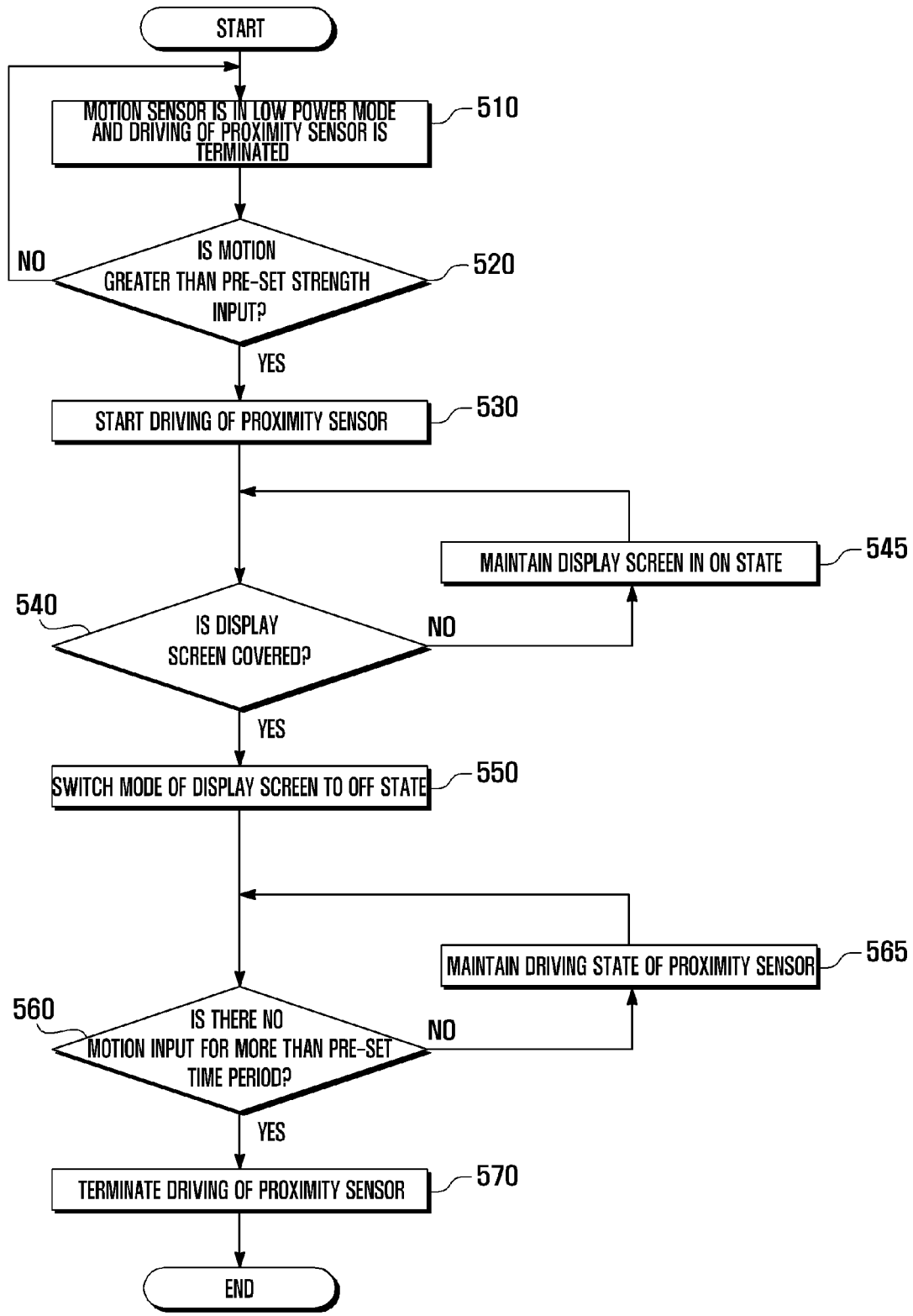
FIG. 5 is a flow chart that describes a method for reducing power consumption of a portable terminal according to an exemplary embodiment of the present invention.

FIG. 5 is a flow chart that describes a method for reducing power consumption of a portable terminal according to an exemplary embodiment of the present invention.

In operation 510, the controller 180 maintains the motion sensor 120 in low power mode and also maintains the proximity sensor in the driving-terminated state. When the controller 180 maintains the motion sensor 120 in low power mode, it also maintains the motion recognition program in the driving-terminated state.

The controller 180, in operation 520, determines whether a motion with strength greater than a pre-set level of strength is input to the portable terminal through the motion sensor 120. If a motion with strength not greater than the pre-set level of strength is input, the controller 180 maintains the driving state of the motion sensor 120 in the low power mode and maintains the driving-terminated state of the proximity sensor 150 at operation 510. If a motion with strength greater than the pre-set level of strength is input at operation 520, the controller 180, in operation 530, starts driving of the proximity sensor 150.

In operation 540, the controller 180 controls the proximity sensor 150 to determine whether the display unit 170 is covered. The proximity sensor 150 may be positioned on the display unit 170 and may sense whether the display unit 170 is partially or entirely covered by an object. When the display unit 170 is partially covered, the controller 180 may determine whether the ratio of the covered portion to the entire display unit 170 is larger than a pre-set ratio.

If the display unit 170 is determined not to be covered at operation 540, the controller 180, in operation 545, maintains the ON state of the display screen. If the display unit 170 is determined to be covered at operation 540, the controller 180, in operation 550, switches the display unit 170 to the OFF state.

In operation 560, the controller 180 determines whether there is a motion input during a pre-set time period. When a motion is input during the pre-set time period, the controller 180, in operation 565, maintains the driving state of the proximity sensor 150. If no motion is input during the pre-set time period, the controller 180, in operation 570, terminates driving of the proximity sensor 150.

In an exemplary embodiment of the present invention, power consumption may be reduced by switching the display unit 170 to the OFF state. When the motion sensor 120 operates in low power mode, the driving of the proximity sensor 150 is started by inputting a motion with strength greater than a pre-set level of strength to the portable terminal, and when the portable terminal is returned to the fixed state, the driving of the proximity sensor 150 is terminated. Whether the display screen is covered is determined through the proximity sensor 150, and when the display screen is covered, the display screen is switched to the OFF state to reduce power consumed by outputting the display screen. Also, if a motion is not input for more than a set time period, the driving of the proximity sensor 150 is terminated to reduce power consumed by driving the proximity sensor 150.

FIG. 6 shows a display unit of the portable terminal according to exemplary embodiments of the present invention.

Referring to FIG. 6, reference number 610 indicates the front of a portable terminal that is executing a music reproducing application. The portable terminal is placed such that the display screen faces upward. The display unit 170 is in an ON state and is not covered by an object.

Reference number 620 indicates the back of a portable terminal whose display unit 170 faces downward. When the display unit 170 faces downward, it is covered by an object and the user cannot view the display unit 170. In this case, the display unit 170 is switched to the OFF state. In an exemplary embodiment of the present invention, the controller 180 determines the placed state of the portable terminal through the motion sensor 120, and if the portable terminal is placed such that the display unit 170 faces downward, the controller 180 switches a state of the display unit 170 to the OFF state.

In comparison, in an exemplary embodiment of the present invention, the controller 180 determines whether the display unit 170 of the portable terminal is covered by an object through the proximity sensor 150, and if the display unit 170 is covered, the controller 180 switches a state of the display unit 170 to the OFF state. In an exemplary embodiment of the present invention, when the display unit 170 is covered besides when the portable terminal is facing downward, the controller 180 switches a state of the display unit 170 to the OFF state.

As described above, the method, according to exemplary embodiments of the present invention, can reduce power consumption in a motion sensor-based portable terminal, thereby lengthening the life span of the battery. Thus, the user can use the motion sensor-based portable terminal for a long period of time without frequently recharging its battery.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for reducing power consumption of a portable terminal, the method comprising:
   terminating driving of a motion recognition program according to whether an input is detected by at least one sensor unit in the portable terminal;
   switching, when the driving of the motion recognition program is terminated, a mode of a controller in the portable terminal to a motion recognition deactivation mode; and
   switching the mode of the controller from the motion recognition deactivation mode to the motion recognition activation mode in response to input of a motion having a strength larger than a set level of strength.

2. The method of claim 1, further comprising:
   terminating driving of the motion recognition program in response to sensing, by a proximity sensor, an object being within a set distance of the portable terminal.

3. The method of claim 2, further comprising:
   switching the mode of the controller to a motion recognition activation mode in response to sensing, by the proximity sensor, a removal of the object from within the set distance; and
   driving the motion recognition program.

4. The method of claim 2, further comprising:
   driving a motion sensor in the portable terminal in a low power mode in response to sensing, by the proximity sensor, a removal of the object from within the set distance;
   driving the motion recognition program.

5. The method of claim 1, further comprising:
   terminating driving of the motion recognition program in response to sensing, by a proximity sensor, an object being within a set distance of the portable terminal while the portable terminal is in a call function state.

6. The method of claim 1, wherein terminating driving of a motion recognition program comprises terminating driving of a motion sensor in the portable terminal.

7. The method of claim 1, wherein the driving of the motion recognition program is terminated if a signal indicating sensing of a motion of the portable terminal is not received for more than a set time period, wherein a motion sensor is configured to sense the motion of the portable terminal.

8. The method of claim 7, further comprising:
   driving the motion recognition program.

9. The method of claim 8, wherein driving the motion recognition program comprises switching a mode of the motion sensor to a general mode.

10. The method of claim 1, wherein terminating driving of the motion recognition program comprises switching a motion sensor of the portable terminal to a low power mode.

11. The method of claim 1, further comprising controlling, via the controller, at least one application.

12. The method of claim 1, wherein the controller is driven at a higher clock frequency in the motion recognition activation mode than a clock frequency in the motion recognition deactivation mode.

13. A portable terminal, comprising:
   a storage unit configured to store a motion recognition program;
   a sensor unit configured to generate a signal for terminating driving of the motion recognition program according to whether an input is detected; and
   a controller configured to switch, when the driving of the motion recognition program is terminated, a mode of the controller to a motion recognition deactivation mode and to switch the mode of the controller from the motion recognition deactivation mode to the motion recognition activation mode in response to an input of a motion having a strength larger than a set level of strength.

14. The portable terminal of claim 13, wherein the sensor unit comprises at least one of a motion sensor and a proximity sensor.

15. The portable terminal of claim 13, wherein the controller is configured to control a motion sensor to be driven in one of a low power mode, a general mode, and a termination mode.

16. The portable terminal of claim 13, wherein the controller is further configured to activate or terminate driving of the motion recognition program in response to receiving a signal generated by the sensor unit.

17. The portable terminal of claim 16, wherein the controller is further configured to switch the mode of the controller from the motion recognition activation mode to the motion recognition deactivation mode or to switch the mode of the controller from the motion recognition deactivation mode to the motion recognition activation mode, according to whether the motion activation program is driven.

18. A method for reducing power consumption of a portable terminal, the method comprising:
receiving at least one input signal from at least one sensor provided in the portable terminal; and
switching a state of a display screen to an OFF state according to the at least one input signal,
wherein switching the state of the display screen to the OFF state comprises determining that a ratio of a covered area of the display screen to an entire display screen area is greater than a threshold ratio.

19. The method of claim 18, wherein receiving at least one input signal comprises receiving a signal from a sensor to sense a placed state of the portable terminal, the signal indicating that the portable terminal is placed such that a display screen of the portable terminal points downwards.

20. The method of claim 18, wherein receiving at least one input signal comprises receiving a signal from a sensor to sense an approach of an object to the portable terminal, the signal indicating that the object is within a set distance of a display screen of the portable terminal.

* * * * *